(12) United States Patent
Truong-Le et al.

(10) Patent No.: US 8,673,357 B2
(45) Date of Patent: *Mar. 18, 2014

(54) SONIC LOW PRESSURE SPRAY DRYING

(75) Inventors: Vu Truong-Le, Campbell, CA (US); Satoshi Ohtake, Milpitas, CA (US); Russell Andrew Martin, Los Gatos, CA (US); Binh V. Pham, San Jose, CA (US); Luisa Yee, Los Altos, CA (US)

(73) Assignee: Aridis Pharmaceuticals, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,096

(22) Filed: Aug. 14, 2012

(65) Prior Publication Data

US 2012/0308526 A1 Dec. 6, 2012

Related U.S. Application Data

(63) Continuation of application No. 12/266,493, filed on Nov. 6, 2008, now Pat. No. 8,268,354.

(60) Provisional application No. 61/002,308, filed on Nov. 7, 2007.

(51) Int. Cl.
*A61K 9/14* (2006.01)
*F26B 5/06* (2006.01)

(52) U.S. Cl.
USPC ............................. 424/489; 34/293

(58) Field of Classification Search
None
See application file for complete search history.

(56) References Cited

U.S. PATENT DOCUMENTS

| | | |
|---|---|---|
| 1,194,827 A | 8/1916 | Edgerton |
| 1,655,222 A | 1/1928 | Elze |
| 2,055,864 A | 9/1936 | Harsch |
| 2,187,779 A | 1/1940 | Gardner |
| 2,378,348 A | 6/1945 | Wilmes et al. |
| 2,713,510 A | 7/1955 | Coanda |
| 2,887,390 A | 5/1959 | Coulter et al. |
| 3,081,946 A | 3/1963 | Soloff |
| 3,371,869 A | 3/1968 | Hughes |
| 3,510,061 A | 5/1970 | Peczeli et al. |
| 3,537,650 A | 11/1970 | Peczeli et al. |
| 3,552,652 A | 1/1971 | Greenwood |
| 3,764,069 A | 10/1973 | Runstadler et al. |
| 3,770,207 A | 11/1973 | Muller et al. |
| 3,774,846 A | 11/1973 | Schurig et al. |
| 3,790,086 A | 2/1974 | Masai |
| 3,970,250 A | 7/1976 | Drews |
| 4,101,073 A | 7/1978 | Curran |
| 4,187,617 A | 2/1980 | Becker et al. |
| 4,331,294 A | 5/1982 | Gilad |
| 4,380,491 A | 4/1983 | Joy et al. |
| 4,408,719 A | 10/1983 | Last |
| 4,541,564 A | 9/1985 | Berger et al. |
| 4,610,760 A | 9/1986 | Kirkpatrick et al. |
| 4,734,401 A | 3/1988 | Blouin |
| 4,930,700 A | 6/1990 | McKnown |
| 4,972,995 A | 11/1990 | Schara et al. |
| 4,978,067 A | 12/1990 | Berger et al. |
| 5,227,017 A | 7/1993 | Tanaka et al. |
| 5,240,183 A | 8/1993 | Bedaw et al. |
| 5,272,820 A | 12/1993 | Ito et al. |
| 5,616,329 A | 4/1997 | Newman et al. |
| 5,639,441 A | 6/1997 | Sievers et al. |
| 5,687,905 A | 11/1997 | Tsai |
| 5,902,565 A | 5/1999 | Cox et al. |
| 5,902,844 A | 5/1999 | Wilson |
| 6,123,936 A | 9/2000 | Platz et al. |
| 6,136,346 A | 10/2000 | Eljamal et al. |
| 6,142,388 A | 11/2000 | Schwab |
| 6,165,463 A | 12/2000 | Platz et al. |
| 6,258,341 B1 | 7/2001 | Foster et al. |
| 6,309,671 B1 | 10/2001 | Foster et al. |
| 6,372,258 B1 | 4/2002 | Platz et al. |
| 6,486,329 B1 | 11/2002 | Albano et al. |
| 6,651,655 B1 | 11/2003 | Licalsi et al. |
| 6,763,607 B2 | 7/2004 | Beyerinck et al. |
| 7,258,873 B2 | 8/2007 | Truong-Le et al. |
| 2002/0120228 A1 | 8/2002 | Maa et al. |
| 2006/0002862 A1 | 1/2006 | Truong-Le et al. |
| 2006/0233830 A1 | 10/2006 | Wong et al. |

FOREIGN PATENT DOCUMENTS

WO WO 2005/123131 A2 * 12/2005

OTHER PUBLICATIONS

Weyenberg et al (European Journal of Pharmaceutics and Biopharmaceutics, 2006, 62: 202-209).*
Wyenberg et al (European Journal of Pharmaceutics and Biopharmaceutics, 2006, 62: 202-209).*

* cited by examiner

*Primary Examiner* — Sean Aeder
(74) *Attorney, Agent, or Firm* — Quine Intellectual Property Law Group, P.C.

(57) ABSTRACT

This invention provides methods of spray drying pharmaceutical powders from a vibrating nozzle at low pressures. The method can effectively spray dry thick or viscous solutions or suspensions to provide small uniform particles. The invention includes dry particle compositions prepared by methods of low pressure spraying from vibrating nozzles.

26 Claims, 4 Drawing Sheets

SONIC LOW PRESSURE SPRAY DRYING

This application is a Continuation application and claims benefit and priority to U.S. application Ser. No. 12/266,493, which claims priority to and benefit of a prior U.S. Provisional Application No. 61/002,308, Sonic Low Pressure Spray Drying, by Vu Truong-Le, et al., filed Nov. 7, 2007. The full disclosure of the prior application is incorporated herein by reference.

FIELD OF THE INVENTION

The invention is a method to stabilize pharmaceuticals using a combination of specific formulations and a spray drying process utilizing high frequency sonic or ultrasonic atomization nozzle. In particular, the methods provide preservation of viruses, bacteria and proteins prepared by low pressure high frequency spraying from vibrating nozzles.

BACKGROUND OF THE INVENTION

Successful stabilization of thermally labile biologicals requires a combination of appropriate formulations, a quick drying process with minimal thermal and mechanical stress, and solid state properties conducive to stable long term storage. Freeze drying and spray drying are two of the most widely used methods for drying API solutions in the pharmaceutical industry. Spray drying provides advantages of high volume product throughput (up to, e.g., 5,000 lb/hr) and reduced manufacturing times over batch process protein preservation/drying technologies, such as freeze drying. The challenge of using spray drying to stabilize thermally labile APIs, such as biopharmaceuticals, involves the control of four key areas: atomization conditions, drying conditions, formulation design, and resultant solid state properties of the dried materials. For example, during atomization, the process of breaking up a liquid stream into fine droplet sizes can involve excessive shear stress, surface tension, and pressure applied to the product, resulting in excessive loss of bioactivity. Additionally, some liquids exhibit high viscosity and density, which requires higher atomization pressure resulting in overly broad droplet size distribution.

Most ultrasonic spray devices and techniques are directed to spraying liquids to form uniform layers on surfaces or to provide high pressure sprays for fuel combustion. See, e.g., U.S. Pat. No. 4,978,067, Unitary Axial Flow Tube Ultrasonic Atomizer with Enhanced Sealing, or U.S. Pat. No. 4,541,564, Ultrasonic Liquid Atomizer, Particularly for High Volume Flow Rates, to Berger, et al. However the problems solved by these techniques are different from those in spray drying of pharmaceuticals. Ultrasonic spray drying of bioactive materials demands high droplet uniformity, quick drying and low stress not found in the prior art.

Conventional ultrasonic nozzles use a piezoelectric transducer to convert electrical energy to mechanical vibrations at ultrasonic frequency range (i.e. greater than 20 kHz). The ultrasonic vibrations are focused at the tip where, as the liquid flows through, the oscillating tip disintegrates the liquid into micro-droplets, and ejects them to form a gentle, low velocity spray of freely flowing formulations at ambient pressure (i.e., pressure-less) conditions. Because the main energy source controlling atomization is mechanical vibrations, the droplet size distribution of the atomized liquid is primarily a function of frequency, and the higher the frequency, the smaller the droplet diameter. However, typical median droplet size of aqueous fluids using these techniques is ~90 microns at 20 kHz, and 45 microns at 40 kHz, which are still large for efficient, fast drying of the droplets to form dry stabilized powders. Another limitation is that the higher the frequency, the lower the processing capacity (i.e. flow rate).

In view of the above, a need exists for a method to spray thick pharmaceutical and vaccine formulations under low shear stress conditions. It would be desirable to be able to spray formulations with a wide range of solution concentrations under low pressures while providing small droplets of uniform size. The present invention provides these and other features that will be apparent upon review of the following.

SUMMARY OF THE INVENTION

The methods of the invention include spraying a solution or suspension of a bioactive material flowing at low pressure through a vibrating nozzle. For example, the methods of preparing pharmaceutical powders containing bioactive materials can include the steps of preparing a suspension or solution comprising the bioactive materials and at least 20% hydrophilic solids by weight, forming a mixture of a pressurized gas with the solution or suspension within a nozzle, vibrating the nozzle at a high vibration frequency ranging from 1 kHz to 100 kHz while spraying the mixture to form a gaseous suspension of droplets, wherein the high frequency vibrations are generated using the pressurized gas, and drying the droplets in a stream of drying gas to form powder particles of the bioactive material. Admixture of a spray gas for high frequency vibration spraying provides a spray different in character, especially in combination with thick formulations. Further differences are realized when the working gas creating the vibrations is also present in the flowing stream from the nozzle. Using the above described methods, particles ranging in average size from about 1 μm to about 20 μm can be sprayed from solutions at pressures lower than 50 psi, even where the solution is thick or viscous, e.g. solids content up to 70% w/v.

The bioactive material for preservation in the pharmaceutical powders can include, e.g., bioactive proteins, peptides, antibodies, enzymes, serums, vaccines, nucleic acids, bacteria, prokaryotic cells, eukaryotic cells, liposomes, viruses, and/or the like. Preferred viruses for inclusion in the powders can include, e.g., rotavirus, adenovirus, measles virus, mumps virus, rubella virus, polio virus, influenza virus, parainfluenza virus, respiratory syncytial virus, herpes simplex virus, Severe Acute Respiratory Syndrome (SARS) virus, corona virus family members, cytomegalovirus, human metapneumovirus, filovirus and Epstein-Bar virus. Preferred bacteria for spraying into the powders can include, e.g., *Pneumococcus, Lactobacillus, Francisella tularensis, Mycobacterium, Salmonella, Shigella, Listeria, Pseudomonas, Staphylococcus, Streptococcus,* and *E. Coli.*

The suspension or solution for spraying can be quite viscous or thick. For example, the sprayed solution or suspension can include substantial amounts of sugars and/or polymers. In preferred embodiments, the solution or suspension includes two or more sugars totaling 25% or more of the suspension or solution by weight. Preferred sugars or polyols can be, e.g., sucrose, trehalose, glucose, raffinose, sorbose, melezitose, glycerol, fructose, mannose, maltose, lactose, arabinose, xylose, ribose, rhamnose, galactose, glucose, mannitol, xylitol, erythritol, threitol, dextrose, fucose, trehalose, polyaspartic acid, inositol hexaphosphate (phytic acid), sialic acid, N-acetylneuraminic acid-lactose, and sorbitol. Preferred polymers can include, e.g., polyvinyl pyrrolidone (PVP), gelatin, collagen, chondroitin sulfate, starch, starch derivatives, carboxymethyl starch, hydroxyethyl starch (HES), polyvinyl alcohol, and/or dextran.

The solutions or suspensions can include other excipients, such as surface active agents, amino acids, and divalent cations. For example, the solutions or suspensions can include a surfactant, such as a block copolymer of polyethylene and polypropylene glycol, polyethylene glycol sorbitan monolaurate, and polyoxyethylene sorbitan monooleate. Preferred amino acids include, e.g., arginine, alanine, lysine, methionine, histidine, and glutamic acid. Examples of divalent cations include, e.g., $Ca^{2+}$, $Zn^{2+}$, $Mg^{2+}$, and $Mn^{2+}$.

The solution or suspension can be mixed with a low pressure gas, such as, e.g., air, nitrogen, oxygen, helium, carbon dioxide, sulfur hexafluoride, chlorofluorocarbons, methane, fluorocarbons, nitrous oxide, xenon, propane, n-pentane, ethanol, water, or the like. Forming the mixture can be accomplished by flowing the solution or suspension with the pressurized gas within a mixing chamber, e.g., within the nozzle. Typically, the mixing occurs before the mixture components exit the spraying nozzle. The mixture can be formed by flowing the suspension into the nozzle at a pressure less than 10 psi, and flowing the gas into the nozzle at a pressure between 10 psi and 50 psi. In preferred embodiments, the pressurized gas is characterized by a pressure of about 50 psi or less. In preferred embodiments, the pressurized gas is characterized by a temperature ranging from about 0° C. to about 90° C.

In certain embodiments, the gas and/or solution includes a modifier, such as, e.g., methanol, ethanol, isopropanol, chloroform, heptane, methyl isobutyl ketone, tetrahydrofuran, ethyl acetate, dichloromethane, dichloromethane:ethanol:isopropanol (5:6:4), acetone and/or the like.

The vibrations of the nozzle can help provide smaller spray droplets than would otherwise occur under the conditions without nozzle vibrations. The nozzle can be vibrated by input of energy, e.g., by input of electrical energy, or the energy of a pressure differential. For example, the vibrations can be due to provision of pulsating voltages to a piezoelectric crystal, or by resonance of fluids flowing with a pressure differential between the suspension or solution and the pressurized gas within the nozzle. The vibration can be a "whistling" resonance of a high pressure gas entering a lower pressure chamber through an appropriately configured orifice.

The nozzle can beneficially vibrate at a high vibration frequency ranging through the sonic range and into the ultrasonic range. For example the vibration can range from about 20 Hz to 200 kHz, from 100 Hz to 150 kHz, from 1 kHz to 100 kHz, from 10 kHz to 50 kHz or about 20 kHz. In a preferred embodiment, the high frequency vibrations range from about 10 kHz to about 30 kHz.

In certain embodiments, the spray dried powders can be further stabilized, e.g., by suspending them in a hydrophobic liquid. This can help exclude damaging water and oxidants from the bioactive material. In some embodiments of the invention, the methods further comprise suspending the powder particles in an organic solvent. Further, highly stable or time releasable forms of the bioactive material can be provided by drying the solvent to form a solid material comprising the bioactive material. In preferred embodiments, the dry particles of the bioactive material include a polymer with some hydrophobic character. In preferred embodiments, the bioactive material is not denatured when the powder particles are suspended in the organic solvent.

The present invention includes compositions of powder particles with unique properties, e.g., produced using the methods of the invention. The compositions can include spray dried particles comprising a bioactive material in a glassy matrix of two or more sugars wherein the bioactive material comprises less than 10% or less than 1% of the particle by weight, and wherein the particles were spray dried in the presence of ultrasonic vibrations from a solution or suspension comprising at least 20% total of the two or more sugars. The powder particles can optionally be suspended in an organic solvent. In a more preferred embodiment, the composition of powder particles includes two or more sugars, such as, e.g., sucrose and trehalose, and the two or more sugars comprise 25% to 50% of the suspension or solution by weight. In a most preferred embodiment, the suspendion or solution for high frequency vibration spraying includes from 7% to 28% w/v sucrose, from 3% to 12% w/v trehalose, from 25 mM to 100 mM potassium phosphate buffer, from 0.5 mM to 20 mM of a divalent cation, from 0.25% to 1% v/v of a plasticizer, and from 0.02% to 0.08% v/v of a surfactant. Plasticizers can include those known in the art such as, e.g., DMSO, glycerol and sorbitol.

DEFINITIONS

Unless otherwise defined herein or below in the remainder of the specification, all technical and scientific terms used herein have meanings commonly understood by those of ordinary skill in the art to which the present invention belongs.

Before describing the present invention in detail, it is to be understood that this invention is not limited to particular devices or biological systems, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a component" can include a combination of two or more components; reference to "a buffer" can include mixtures of buffers, and the like.

Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

The term "about", as used herein, indicates the value of a given quantity can include quantities ranging within 10% of the stated value, or optionally within 5% of the value, or in some embodiments within 1% of the value.

The term "low pressure gas", as used herein, refers to gasses at pressures of less than 200 psig, less than 100 psig, less than 50 psig, less than 25 psig, less than 10 psig, or less. Low pressure gasses are at pressures more than 10% below, typically more than 20% below, their critical pressure at a given temperature. Although a higher pressure gas may be introduced to a mixing chamber of a nozzle, the spraying can be considered low pressure based on the pressure within the chamber.

The term "ultrasonic", as used herein, indicates a frequency above 20 kHz. With regard to the present invention, preferred ultrasonic frequencies for vibration of a spray nozzle can be from about 20 kHz to about 200 kHz, form about 40 kHz to about 150 kHz, from about 50 kHz to about 100 kHz, or about 75 kHz. The term "high frequency" refers to high sonic pitches (e.g., above about 1 kHz) and ultrasonic frequencies.

As used herein, the terms "solution and suspension" and "liquid formulation" are often used interchangeably.

A bioactive material, such as an enzyme, antibody, vaccine antigen, virus, bacteria, protein receptor, nucleic acid, and the like, has a bioactivity, as understood in the art.

Hydrophilic solids are molecular species that exist as a solid at room temperature and are soluble at concentration of at least 10 mM in aqueous solution at 25° C.

BRIEF DESCRIPTION OF THE DRAWINGS

FIG. 1 shows a schematic diagram of an exemplary high frequency spray nozzle.

FIG. 4 shows a chart of particle size distribution for spraying water at a pressure of 20 psi from a nozzle vibrating at a high frequency.

FIG. 5 shows a chart of stability for sonic spray-dried particles containing viral bioactive material.

Figures 6, 7:
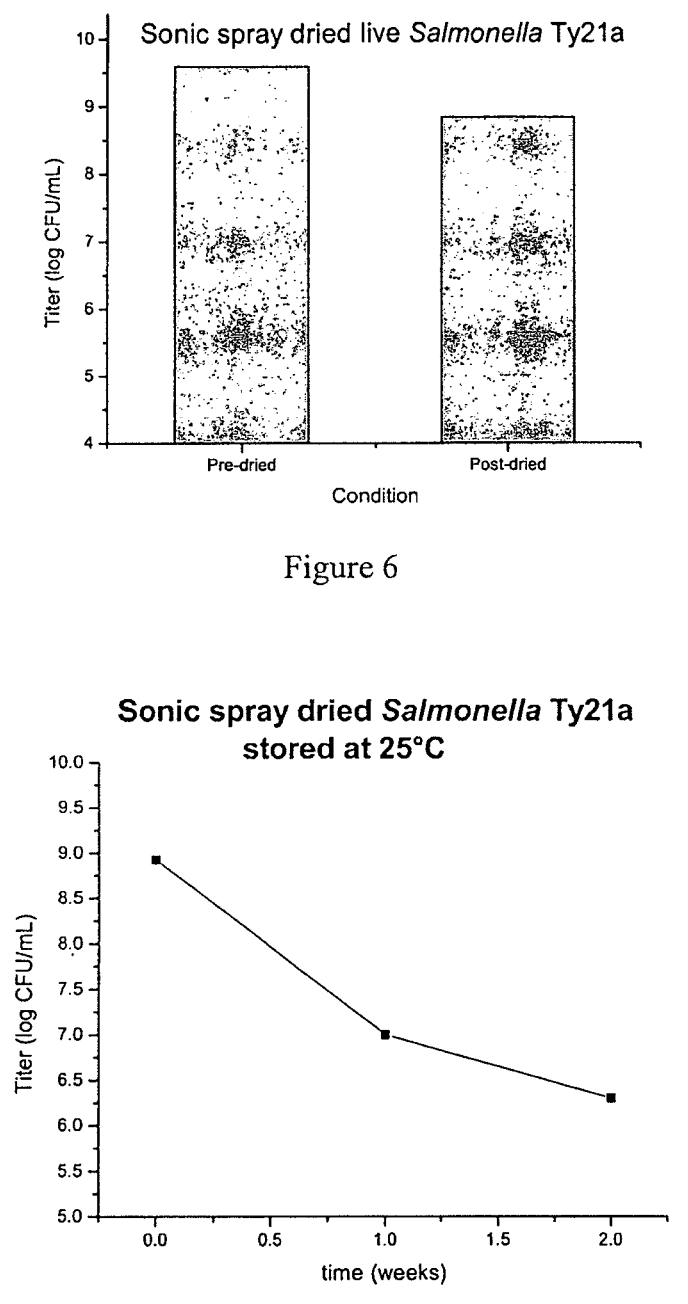

FIG. 6 shows a chart of *Salmonella* viability before and after spray drying using methods of the invention.

FIG. 7 is a chart showing stability data for storage of sonic spray dried *Salmonella*.

DETAILED DESCRIPTION

Figure 2:
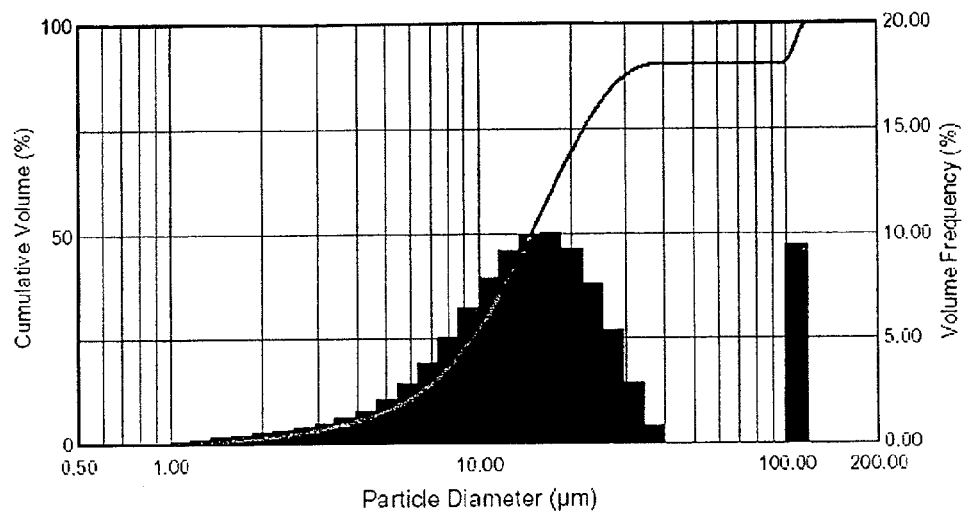
FIG. 2 shows a chart of particle size distribution for spraying 10% sucrose at a pressure of 20 psi from a nozzle vibrating at a high frequency.

The present invention is directed to methods of spray drying that can spray high solids concentration solutions or suspensions for quick drying without the use of high pressures. The application of the powder production methods provides advantages of high volume product throughput, reduced manufacturing times over other pharmaceutical drying methods such as lyophilization. The presently described ultrasonic spray drying methods are broadly applicable to all pharmaceutical compounds and can achieve stabilization better than spray drying methods employing conventional two-fluid nozzles.

In typical embodiments of the inventive methods, a liquid formulation of a bioactive material is mixed with a stream of low pressure gas. The mixture is exposed to high frequency vibrations and sprayed as droplets into a drying chamber. A drying gas removes liquid solvents from the droplets leaving dry powder particles. The technique has the advantages of being able to spray thick solutions or relatively coarse particulate suspensions without exposing them to harmful levels of pressure, shear, processing time, and temperature. The combination of low pressure spraying and vibration treatment can provide more uniform droplets from even hard to spray liquids. The thick and/or uniform droplets can be dried more quickly and/or at lower temperatures.

Key attributes to this invention involve the identification of unique formulation combinations well suited to application of low pressure ultrasonic nozzles, such as the SONICAIR™ nozzle (IVEK corp., N. Springfield, Vt.).

As the solids content is increased, the liquid load to be dried decreases, and hence higher processing throughput is achieved. Additionally, the combination can provide a smaller droplet size distribution, and a higher surface area-to-volume ratio, which means faster drying at lower heating load. Lower heat load exposes the bioactive material to a lower thermal stress, thereby reducing process-related bioactivity loss. Therefore, the application of a more optimized nozzle can reduce the stresses involved in atomization and drying. Further stress reduction and improvement in storage stability involves rational selection of stabilizing excipients. Formulated protein powders can include other substances to enhance active stability, reduce process losses and reduce reconstitution times, such polyhydroxy compounds (sugars), amino acids, divalent cations, surfactants, and other water soluble polymers (synthetic or naturally derived).

In the present invention low pressure sprayed high frequency atomized spray dried powders were found to be surprisingly stable suspended in a variety of organic solvents (or solvent mixtures) for up to one hour at 55° C. This property allowed the active proteinaceous ingredient such as antibodies, enzymes, bacteria, viruses, cells, etc to remain biologically active under manufacturing processes involving harsh organic solvents and heat. For example, this stabilizing property enabled the incorporation of formulated, spray dried live viruses into wafers or thin films for oral delivery. Excipients competing with bioactive proteins for the water/organic solvent interface surfactants (e.g. polyoxymers, Tween, etc.) and polymers (e.g. polyvinyl alcohol, etc) can help protect the proteins against exposure to organic solvents by driving the proteins into the core of the particles and away from the particle surface. Moreover, excipients that exhibit preferential hydrogen bonding or 'hydration' of the protein in the aqueous and in the dry state, such as sucrose, may stabilize the protein via water substitution yielding a protective coating around the protein surface. [Cleland, J L and Jones, A J. Pharm Res. 1996 October; 13(10):1464-75].

Applicable active pharmaceutical compounds for preservation by the inventive methods include, e.g., monoclonal antibodies, therapeutic proteins, peptides, live viruses, live bacteria, and other bioactive materials. The stabilizing formulation components include, but are not limited to, a buffer, a polyol, a surfactant, a plasticizer, an amino acid, and/or a polymer. The spray drying process can employ high frequency atomization nozzles to produce dry powder particles that can be room temperature stable and exhibit appropriate powder properties for deep lung delivery as well as for fabrication into other dosage formats such as oral wafers, oral thin films, capsules, tablets, etc.

In an exemplary embodiment of the inventive methods, a solution of active pharmaceutical ingredient (API) is first formulated with stabilizing excipients, then atomized from a sonic nozzle or ultrasonic nozzle operated at a low pressure range (5-100 psig) using a pressurized gas, with or without an organic solvent serving as a liquid modifier. The atomized API is caused to dry into powder particles by infusing a stream of dry, heated gas co-current to the spray plume. The spray drying equipment can be any commercially available spray dryers but substituted with commercially available ultrasonic nozzles. Preferably the sonic/ultrasonic nozzles are non-piezoelectric and operate at low pressure range. The atomizing gas can be air or any other gases, preferably air, nitrogen, $CO_2$ at or near supercritical state. Preferably, the atomizing gas is introduced to a liquid stream of the formulated API before the ultrasonic spraying step. The gas used to evaporate the atomized solution, i.e. the drying gas, is typically heated and can be air, nitrogen, argon, or the like.

Preparing a Solution or Suspension

In the present invention, solutions or suspensions can be prepared using appropriate techniques known in the art. Appropriate formulations for input to the low pressure vibrating spray dry processes of the present invention can, e.g., include relatively fragile bioactive materials, include relatively thick (viscous) solutions or suspensions, and/or include relatively high total solids content. Formulations for spraying in the present invention include, e.g., one or more desired bioactive materials plus one or more excipients.

Bioactive materials in the formulations for spraying in the present invention include, e.g., bioactive proteins, nucleic acids, living cells, viruses, bacteria, fungi, protista, and/or the like. Excipient constituents of the formulations can include sugars, polymers, buffers, surfactants, chelators, salts, amino acids, and/or the like.

Bioactive protein materials can include any enzymes, ligands, antibodies, antigens, receptors, cytokines, active fragments, and/or the like. For example, bioactive proteins can include, but are not limited to, growth factors, cytokines, antigens, antibodies, interleukins, lymphokines, interferons, enzymes, etc., including, but not limited to, anti-IgE antibodies, tissue plasminogen activator (tPA), calcitonin, erythropoietin (EPO), factor IX, granulocyte colony stimulating factor (G-CSF), granulocyte macrophage colony stimulating factor (GM-CSF), growth hormone (particularly human growth hormone), heparin (including low molecular weight heparin), insulin, insulin-like growth factors I (IGF-I) and II (IGF-II), interleukins, α-interferon, β-interferon, γ-interferon, luteinizing hormone-releasing hormone, somatostatin and analogs, vasopressin and analogs, follicle stimulating hormone, amylin, ciliary neurotrophic factor, growth hormone releasing factor, insulinotropin, macrophage colony stimulating factor (M-CSF), nerve growth factor, parathyroid hormone, α-1 antitrypsin, anti-RSV (respiratory syncytial virus) antibody, DNase, Her2 (Human Epidermal growth factor Receptor 2) and the like. Viruses in the formulation can include, e.g., influenza virus, parainfluenza virus, respiratory syncytial virus, human metapneumovirus, corona virus family members, human immunodeficiency virus, herpes simplex virus, cytomegalovirus, SARS (Severe Acute Respiratory Syndrome) virus, Epstein-Barr virus, and/or the like. Bacteria in the formulation can include, e.g., *Salmonella, Shigella, Listeria, Lactobacillus, Pseudomonas, Staphylococcus, Streptococcus*, and *E. Coli.*

Sugar excipients can include, e.g., monosaccharides (galactose, D-mannose, sorbose, etc.), disaccharides (lactose, trehalose, sucrose, etc.), cyclo dextrins, and polysaccharides (raffinose, maltodextrins, dextrans, etc.). Preferred sugars are, e.g., sucrose, trehalose, glucose, raffinose, sorbose, melezitose, glycerol, fructose, mannose, maltose, lactose, arabinose, xylose, ribose, rhamnose, galactose, glucose, mannitol, xylitol, erythritol, threitol, and sorbitol. In preferred embodiments, sugars are the major excipient constituent of the formulations (solvents not being considered excipients). In many embodiments of the methods, sugars account for 5% to 99% of the total solids, 20% to 90%, 30% to 80%, 50% to 70% or 60% of the total solids. In many embodiments, the liquid formulation for spraying includes from about 5% to about 70% sugar by weight, 20% to 60%, 30% to 50% or about 40% sugar by weight.

Polymers can be useful, e.g., in certain time-release compositions, in forming protective matrices around bioactive materials and/or to provide structural strength to sprayed products. Exemplary polymers useful in the formulations can include carrageenan, polylactides, copolymers of L-glutamic acid and gamma-ethyl-L-glutamate, human serum albumin (HSA), nonhydrolyzed gelatin, poly(2-hydroxyethyl methacrylate), ethylene vinyl acetate, poly-D-(−)-3-hydroxybutyric acid, actin, dextran, myosin, methylcellulose, xanthan gum, polyvinyl pyrrolidone, collagen, chondroitin sulfate, a sialated polysaccharide, microtubules, dynein, kinetin, hydrolyzed gelatin, and/or the like.

Buffers can be useful in enhancing the stability of many bioactive materials. Suitable buffers include, e.g., acetate, citrate, succinate, ammonium bicarbonate, phosphate, carbonate, and the like. Generally, buffers are used at molarities from about 1 mM to about 1 M. Typically, the buffers are selected and adjusted to provide a physiological pH, such as pH 7.4, of a pH ranging from about pH 4 to about pH 9, from pH 5 to pH 8, or about pH 7.

Surfactants can be included in the formulations, e.g., to stabilize membranes, help reduce droplet sizes, enhance the solubility of other formulation constituents, and the like. Preferred surfactants in the formulations are typically non-ionic surfactants. For example, preferred surfactants can include block copolymers of polyethylene and polypropylene glycol, polyethylene glycol, sorbitan monolaurate, and polyoxyethylene sorbitan monooleate.

Salts and/or chelators can be included in the formulations, e.g., to help stabilize protein structures, viral capsids, cell membranes. Optionally, removal of certain metal ions with chelators can reduce degradation due to proteases, nucleases, lipases and the like. Exemplary salts and chelators can include, e.g., $Ca^{2+}$, $Zn^{2+}$, $Mg^{2+}$, and EDTA.

Certain zwitterions can be useful in stabilizing the formulations. Formulations used in the methods often include one or more amino acids, such as, e.g., arginine, alanine, lysine, methionine, histidine, and glutamic acid.

A convenient way to prepare a solution of suspension formulation for spraying in the recent methods is to harvest and/or purify the desired bioactive material in a somewhat concentrated form, then to mix the bioactive material with a concentrated stock formulation in appropriate proportions. For example, a centrifuged pellet of bacterial cells or virus can be blended into a 1.5× formulation stock, and sufficient quantity of pure water added to obtain a 1× formulation. Alternately, a 2× concentrate of a bioactive molecule of cell can be mixed 1:1 with a 2× formulation concentrate. Optionally, the desired amount of bioactive material can be dialyzed into a desired volume of a 1× formulation stock.

Forming a Mixture with a Low Pressure Gas

In the present methods, the formulation is typically mixed with a gas, at a low pressure before or during exposure to ultrasonic vibrations. Although the formulation and/or gas can be delivered to the proximity of the mixing chamber at relatively high pressures, it is preferred the blending of the spray gas and formulation takes place at relatively low pressures.

Often the mixture of liquid formulation and low pressure gas takes place in a mixing chamber. The mixing chamber can be simply a conduit through which the formulation and gas are made to flow through together. Optionally, the mixing chamber can include obstructions, textures, baffles, etc., that enhance the intermixing of the gas and liquid phases as they flow through the chamber. Optionally, there is no substantial mixing chamber, but, e.g., only a common port where the formulation and gas exit a vibration nozzle together.

The spray gas and liquid formulation can be mixed in a controlled mass flow ratio. The mass flow ratio (gas/liquid) of the low pressure gas flow rate to the suspension or solution flow rate can be between about 0.1 and 100, preferably between 1 and 20, more preferably between 1 and 10, and most preferably between 0.5 and 2. In many embodiments the mass flow ratio is about 1. Because the ultrasonic nozzle helps reduce the size of droplets formed in the methods, relatively low gas flow rates can be adequate compared to other spray dry techniques.

Pressures within mixing chambers typically range from about 5 psig to about 100 psig. Although the gas and/or formulation may be delivered to the mixing chamber of ultrasonic nozzle at higher pressures, they are typically stepped down, e.g., by passage through a constriction, resonator, valve or diaphragm before the mixing or spraying steps. The mixture typically takes place at a low pressure ranging, e.g., from about 3 psig to about 100 psig, from about 5 psig to about 75 psig, from about 10 psig to about 50 psig, or about 30 pisg.

Vibrating a Spray Nozzle

It is an aspect of the present invention that mixtures of spraying gas and liquid formulations of bioactive materials are exposed to high frequency vibrations (e.g., high sonic or low ultrasonic frequencies) before the mixtures are sprayed for drying. The mixtures can be vibrated at high sonic frequency or "sonicated" at ultrasonic frequencies, e.g., as the mixture is being formed (e.g., in a mixing chamber), within the body of a sonic nozzle, and/or at an exit orifice of a sonic nozzle. Optionally, the mixtures can be formed before exposure to the high frequency vibrations.

Figure 1:
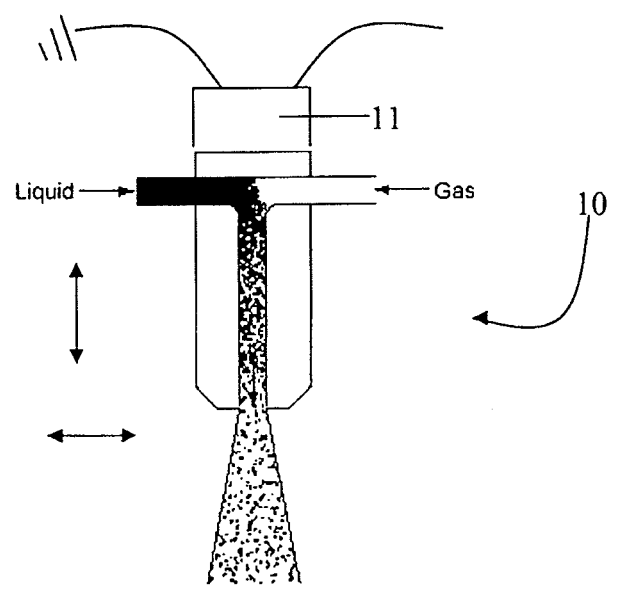

Vibrating a spray nozzle at a high frequency can be accomplished using any technique known or practiced in the art. For example, as shown in FIG. 1, it is known to vibrate spray nozzles at ultrasonic frequencies by contacting the nozzle with a piezoelectric device 10 configured to vibrate at an ultrasonic frequency. Piezoelectric actuators 11 can be incorporated into the body of a spray nozzle and energized with electric voltage at an ultrasonic frequency to vibrate the nozzle along the axis of the nozzle and/or in a direction lateral to the nozzle axis.

Alternately, sonic or ultrasonic vibrations can be generated in a nozzle by the harmonic interaction of a pressurized fluid passing through a conduit or port. For example, sonic nozzles can be activated by pressurized gas or fluid passing through a resonance chamber, e.g., passage through a convergent/divergent section of a conduit at high velocities to expand into a resonator cavity where it is reflected back to complement and amplify a primary shock wave (e.g., similar in function to a sonic toy whistle). The result can be an intensified field of sonic energy focused between the nozzle body and the resonator. The frequency of the resonance can be influenced, e.g., by the mass of the high pressure fluid, the fluid pressure, the size of the resonator cavity, the mass of the nozzle, the location of the resonator cavity within a nozzle, etc.

The size and uniformity of the droplets thus sprayed can be influenced by the vibrations. For example, the frequency, amplitude and direction of the vibrations can affect the droplets. In general, median droplet size is inversely proportional to frequency to the ⅔ power, such that a higher frequency will provide smaller droplet size; and a higher power will provide a smaller droplet size, up to a point. Of course, results can vary, e.g., in combination with other droplet size-affecting parameters, such as liquid flow rate, liquid viscosity, mass ratio, mixture pressure, etc.

In preferred embodiments, the mixture is exposed to spray nozzle operating at high sonic to ultrasonic frequencies ranging from 1000 Hz to 200 kHz. In many embodiments useful for spraying bioactive formulations, the preferred frequencies range from about 5 kHz to about 100 kHz, from 10 kHz to about 70 kHz, or from 30 kHz to about 50 kHz. In many embodiments, the preferred nozzle vibration frequency ranges from about 10 kHz to about 30 kHz.

For a typical liquid formulation flow of 1 ml/min, the sonic/ultrasonic nozzle energy can range, e.g., from 0.1 W to 20 W, from 0.5 W to 10 W, or about 1 W.

Sonicating nozzles typically vibrate with a sin wave, which may be polarized, or not. Optionally, the vibrations, in any dimension, can describe a saw tooth, square wave, clipped wave, etc. The vibrations can be along the axis of the nozzle (e.g., spray direction), across the axis, and/or around the axis.

Drying Droplets

Droplets of suspensions or solutions can be dried to form particles. The drying can be by any means appropriate to the droplet composition and intended use. For example, the droplets can be sprayed into a stream of drying gas, onto a drying surface, into a cold fluid to freeze the droplets for later lyophilization, and/or the like. "Dry" particles are typically not liquid and can have a moisture content (e.g., residual moisture) of less than 15%, less than 10%, less than 5%, less than 3%, less than 1.5% or about 1%.

In one embodiment, the droplets are sprayed into a stream of a drying gas. For example, the drying gas can be an inert gas, such as nitrogen, at a temperature ranging from ambient temperatures to 200° C. Because the present methods can provide droplets of small uniform size, high in solids, drying conditions can be moderate, thus minimizing stress and degradation of constituent bioactive materials. In many cases, the stream of drying gas can enter the drying chamber to contact the droplets at a temperature of 150° C. or less, 100° C., 70° C., 50° C., 30° C. or less. The particles can be collected by settling, filtration, impact, etc. Particles can be exposed to secondary drying conditions to remove additional moisture.

Alternately, the droplets can be lyophilized to dryness. In one embodiment, the droplets are sprayed into liquid nitrogen to form frozen droplets. The droplets can settle out of the liquid nitrogen, or be removed by filtration or evaporation of the nitrogen. The collected frozen droplets can be placed in a vacuum chamber and lyophilized to form dry particles, e.g., without ever exposing the bioactive materials to high temperatures.

EXAMPLES

The following examples are offered to illustrate, but not to limit the claimed invention.

Example 1

Low Pressure Ultrasonic Spray Drying

Various formulations and process conditions were used to spray dry viruses. In each case, the spray technique involved a combination of the cited formulation with a spray gas at low pressure. The gas/liquid mixture was then sprayed from a nozzle energized with ultrasonic vibrations.

Study 1—

A live G3 strain type rotavirus was low pressure sonically spray dried under the following conditions:

a) A liquid formulation of rotavirus was blended with a concentrate of SD01 formulation (1×: 7% w/v sucrose, 3% w/v trehalose, 25 mM potassium phosphate buffer, 0.25% v/v glycerol, 0.02% v/v Pluronic F-68, pH 7.0) to provide a solution or suspension comprised of 6.87 log ffu/mL (fluorescence focus units/mL) rotavirus and 25% solids content.

b) The formulation was combined at a flow of 0.75 mL/min with a stream of nitrogen gas at 40 psi in a mixing chamber of a nozzle.

c) The nozzle was vibrated at ultrasonic frequencies.

d) The formulation/gas mixture was sprayed into a drying chamber while drying gas flowed into the chamber at 70° C. Drying gas exited the chamber at 50° C. outlet temperature.

e) Dry particles containing 2.45% residual moisture were collected. After reconstitution, the formulation had a time zero ($t_0$) titer of 6.94 log ffu/mL (no significant loss of virus viability).

f) To study the stability of the spray dried rotavirus, dry powder particles were held at elevated temperatures and the virus titer was monitored. After 6 days at 37° C., the rotavirus had a reconstituted titer of 6.68 log ffu/mL. After 6 days at 45° C., the rotavirus had a reconstituted titer of 6.73 log ffu/mL.

Study 2—

A live G3 strain type rotavirus was low pressure sonically spray dried under the conditions described above, with the exception of adjusting the drying gas inlet temperature to 50° C. and the outlet temperature to 40° C. The resultant powder particles were dried to a moisture content of 3.51% and retained a reconstituted titer of 6.62 log ffu/mL.

Study 3—

A live G3 strain type rotavirus was low pressure sonically spray dried under the conditions described in Study 1, with the exception of adjusting the spray gas pressure to 60 psi, the drying gas inlet temperature to 50° C., and the outlet temperature to 40° C. The resultant powder particles were dried to a moisture content of 2.43% and retained a reconstituted titer of 6.54 log ffu/mL.

Study 4—

A live G3 strain type rotavirus was low pressure sonically spray dried under the conditions described in Study 1, with the exception of adjusting the spray gas pressure to 60 psi, the drying gas inlet temperature to 50° C., and the outlet temperature to 40° C. A liquid formulation of rotavirus was blended with a concentrate of SD03 formulation (1×: 7% w/v sucrose, 3% w/v trehalose, 25 mM potassium phosphate buffer, 0.02% v/v Pluronic F-68, pH 7.0) to provide a solution or suspension comprised of 6.82 log ffu/mL and 25% solids content. The formulation was low pressure ultrasonically spray dried (to 4.29% moisture), as described above, followed by freeze drying for 16 hours at 4° C. (to 2.66% moisture). The resultant powder particles retained a reconstituted titer of 6.57 log ffu/mL.

Study 5—

A live G3 strain type rotavirus was low pressure sonically spray dried under the conditions described in Study 1, with the exception of adjusting the spray gas pressure to 60 psi, the drying gas inlet temperature to 50° C., and the outlet temperature to 40° C. A liquid formulation of rotavirus was prepared with a concentrate of SD02 formulation (1×: 7% w/v sucrose, 3% w/v trehalose, 25 mM potassium phosphate buffer, 0.5% glycerol, 0.02% v/v Pluronic F-68, pH 7.0) to provide a solution or suspension comprised of 6.77 log ffu/mL rotavirus and 25% solids content. The formulation was low pressure ultrasonically spray dried (to 3.33% moisture), as described above, followed by freeze drying for 16 hours at 4° C. (to 2.26% moisture). The resultant powder particles retained a reconstituted titer of 6.37 log ffu/mL.

Study 6—

Spray drying live rotavirus G3 vaccine at high solids content. A live G3 type rotavirus was low pressure sonically spray dried under the conditions described in Study 1, with the exception of adjusting the spray gas pressure to 60 psi, the drying gas inlet temperature to 50° C., and the outlet temperature to 40° C. The virus was formulated with liquid formulation SD01, however, providing a total solids content of 50%; see FIG. 5, Stability of spray dried G3 rotavirus at 37° C. and 45° C. storage.

Study 7—

A live G1 strain rotavirus was low pressure sonically spray dried under the conditions described in Study 1, with the exception of adjusting the spray gas pressure to 15 psi, the flow rate to 0.5 mL/min, the drying gas inlet temperature to 60° C., and the outlet temperature to 40° C. The virus was titrated to 6.2 log ffu/mL and formulated with liquid formulation SD01 (at 20% solids content) containing three additional components, which were 2 mM $ZnCl_2$, 2 mM $CaCl_2$, and 0.8% (w/w) sodium citrate. The solution pH was adjusted to 6.3. This formulation is referred to as SD01ZC. Process loss was less than 0.2 log ffu/mL and the initial titer did not decrease after 2 months of storage at 37° C., or after 3 months of storage at 4° C. and at 25° C. The spray dried powder contained 2.4% residual moisture content.

Study 8—

A live G1 strain rotavirus was low pressure sonically spray dried under the conditions described in Study 1, with the exception of adjusting the spray gas pressure to 15 psi, the flow rate to 0.5 mL/min, the drying gas inlet temperature to 60° C., and the outlet temperature to 40° C. The virus was titrated to 6.2 log ffu/mL and formulated with 21.6% (w/v) sucrose, 33 mM potassium phosphate, 15 mM glutamate, 2 mM $ZnCl_2$, 2 mM $CaCl_2$, and 0.8% (w/w) sodium citrate. The solution pH was adjusted to 6.3. Process loss was negligible, however the initial titer decreased by 1.2 log ffu/mL after 2 months of storage at 37° C. The titer decrease was much lower after 3 months of storage at 4° C. and at 25° C. (<0.1 log ffu/mL). The spray dried powder contained 3.1% residual moisture content.

Study 9—

A mixture of live G1 and G3 type rotavirus was spray dried using an ultrasonic nozzle at low pressure under the conditions described in Study 1, with the exception of adjusting the spray gas pressure to 15 psi, the flow rate to 0.5 mL/min, the drying gas inlet temperature to 60° C., and the outlet temperature to 40° C. Both of the strains were titrated to 6.1 log ffu/mL and formulated with SD01ZC. The solution pH was adjusted to 6.3.

Study 10—

A mixture of live G1, G3, G4, and G9 type rotavirus was spray dried using an ultrasonic nozzle at low pressure under the conditions described in Study 1, with the exception of adjusting the spray gas pressure to 15 psi, the flow rate to 0.5 mL/min, the drying gas inlet temperature to 60° C., and the outlet temperature to 40° C. All four strains were titrated to 5.6 log ffu/mL and formulated with SD01 at 20% solids content. The solution pH was adjusted to 6.3.

Study 11—

Spray drying live measles virus. A live measles virus was low pressure sonically spray dried under the following conditions:

a) All formulations were prepared with Edmonton-Zagreb live attenuated virus cultured in Vero cells, which upon harvest had a fluorescence focus assay (FFA) titer of 6.0 $\log_{10}$. The viruses were stabilized in 7.2% (w/v) sucrose and 50 mM potassium phosphate buffer. A series of measles formulations were prepared by mixing the measles virus solution with a concentrated stock containing the various components as shown in Table 1. Formulated measles virus had a titer of 5.4 $\log_{10}$.

b) The formulation was combined at a flow of 0.5 mL/min with a stream of nitrogen gas at 15 psi in a mixing chamber of a nozzle.

c) The nozzle was vibrated at ultrasonic frequencies.

d) The formulation/gas mixture was sprayed into a drying chamber while drying gas flowed into the chamber at 60° C. Drying gas exited the chamber at 40° C. outlet temperature.

e) Dry particles were collected and the virus titer was analyzed (after reconstitution) in order to determine the degree of process-related loss. The residual moisture content of the spray dried powder as well as the titers of the reconstituted measles virus are shown in Table 2.

f) The collected powders were stored at 4, 25, and at 37° C. in order to determine the stability of the spray dried measles virus. The virus titers upon reconstitution at various time points are shown in Table 2.

TABLE 2

Stability of low pressure sonically spray dried measles virus stored at 37° C. Residual moisture contents of the spray dried measles virus are also provided. The measles virus titer prior to processing was 5.4log $TCID_{50}$/mL.

| Formulation | Moisture Content (%, w/w) | Reconstituted virus titer (log $TCID_{50}$/mL) after storage at 37° C. for the indicated time | | | | |
|---|---|---|---|---|---|---|
| | | Initial | 1 week | 2 weeks | 4 weeks | 8 weeks |
| M1 | 3.7 | 5.4 | 4.1 | 3.7 | 3.7 | 2.8 |
| M2 | 3.9 | 5.2 | 4.2 | 3.8 | 3.6 | 3.5 |
| M3 | 4.3 | 5.4 | 4.2 | 4.2 | 3.8 | 3.2 |
| M4 | 3.5 | 5.8 | 4.2 | 4.3 | 3.7 | 2.5 |
| M5 | 3.1 | 5.7 | 4.1 | 3.8 | 3.4 | 2.7 |
| M6 | 3.6 | 4.9 | 4.1 | 3.8 | 3.8 | 3.0 |
| M7 | 3.3 | 5.0 | 4.0 | 4.2 | 3.5 | 3.0 |
| M8 | 3.2 | 5.4 | 3.8 | 3.8 | 3.8 | 2.9 |

Study 12—

Spray drying live measles virus. A live measles virus was low pressure sonically spray dried under the conditions described in Study 11, with the exception of adjusting formulated measles virus titer to 4.3 $\log_{10}$.

a) The formulation components used to stabilize the measles virus are shown in Table 3.

b) Dry particles were collected and the virus titer was analyzed (after reconstitution) in order to determine the degree of process-related loss. The residual moisture content of the spray dried powder as well as the titers of the reconstituted measles virus are shown in Table 4.

c) The dry measles particles were stored at 4, 25, and at 37° C. in order to determine the stability of the spray dried powders. The virus titers upon reconstitution at the various time points are shown in Table 4.

TABLE 1

Formulation components for measles virus comprised of 25% solids content with a virus titer of 5.4$\log_{10}$.

| Components | Formulation | | | | | | | |
|---|---|---|---|---|---|---|---|---|
| | M1 | M2 | M3 | M4 | M5 | M6 | M7 | M8 |
| Trehalose (%, w/v) | 8.33 | 8.33 | 8.33 | 8.33 | 8.33 | 8.33 | 8.33 | 8.33 |
| Sucrose (%, w/v) | 16.7 | 12.7 | 6.4 | 6.7 | 7.4 | 10.4 | 9.4 | 16.7 |
| Myo-inositol (%, w/v) | | | | 10 | | | | |
| Sorbitol (%, w/v) | | | | | 3 | | | |
| Gelatin (%, w/v) | | | 6.25 | | 6.30 | 6.25 | 6.25 | |
| Potassium $PO_4$ (mM) | 69.4 | 69.4 | 69.4 | 69.4 | 69.4 | 69.4 | 69.4 | |
| Sodium Citrate (mM) | | | | | | | | 50 |
| L-Arginine (%, w/v) | | 4 | 4 | | | | | |
| Human albumin (%, w/v) | | | | | | | 1 | |
| Glycerol (%) | 1.25 | 1.25 | 1.25 | 1.25 | | 1.25 | 1.25 | 1.25 |
| Pluronic F68 (%) | 0.06 | 0.06 | 0.06 | 0.06 | 0.06 | 0.06 | 0.06 | 0.06 |
| pH | 7 | 7 | 7 | 7 | 7 | 7 | 7 | 7 |

TABLE 3

Formulations for measles virus comprised of 25% solids content with a virus titer of 4.3log$_{10}$.

| Components | Formulation | | | | | | | | |
| --- | --- | --- | --- | --- | --- | --- | --- | --- | --- |
| | M9 | M10 | M11 | M12 | M13 | M14 | M15 | M16 | M17 |
| Trehalose (%, w/v) | 8.33 | 8.33 | 8.33 | 8.33 | 8.33 | 8.33 | 8.33 | 8.33 | 20.98 |
| Sucrose (%, w/v) | 12.7 | 12.65 | 12.65 | 12.65 | 12.65 | 12.65 | 12.65 | 12.65 | |
| Potassium PO$_4$ (mM) | 69.4 | 69.4 | 69.4 | 69.4 | 69.4 | 69.4 | 69.4 | 69.4 | 69.4 |
| L-Arginine (%, w/v) | 4 | 4 | 4 | 4 | 4 | 4 | 4 | 4 | 4 |
| Glycerol (%) | 1.25 | 1.25 | 1.25 | 1.25 | 1.25 | 1.25 | 1.25 | 1.25 | |
| Pluronic F68 (%) | 0.06 | 0.06 | 0.06 | 0.06 | 0.06 | 0.06 | 0.06 | 0.06 | 0.06 |
| MgCl$_2$ (mM) | | | 2 | | | | | | |
| CaCl$_2$ (mM) | | | | 2 | | | | 2 | |
| ZnCl$_2$ (mM) | | | | | 2 | | | 2 | |
| MnCl$_2$ (mM) | | | | | | | 2 | | |
| EDTA (mM) | | | | | | 2 | | | |
| pH | 7 | 6 | 6 | 6 | 6 | 6 | 6 | 6 | 6 |

TABLE 4

Stability of low pressure sonically spray dried measles virus stored at 37° C. Residual moisture contents of the spray dried measles virus are also provided. The measles virus titer prior to processing was 4.3 log TCID$_{50}$/mL.

| Formulation | Moisture Content (%, w/w) | Reconstituted virus titer (log TCID$_{50}$/mL) after storage at 37° C. for the indicated time | | | |
| --- | --- | --- | --- | --- | --- |
| | | Initial | 1 week | 2 weeks | 4 weeks |
| M9 | 3.8 | 3.9 | 2.4 | 2.0 | ND |
| M10 | 3.6 | 3.7 | 2.8 | 2.5 | ND |
| M11 | 3.0 | 3.8 | 2.5 | 2.5 | ND |
| M12 | 3.3 | 3.6 | 2.5 | 2.5 | ND |
| M13 | 2.6 | 3.8 | 2.5 | 2.5 | ND |
| M14 | 2.8 | 3.6 | 2.7 | 2.7 | 2.3 |
| M15 | 3.1 | 3.4 | 2.6 | 3.0 | 2.1 |
| M16 | 3.6 | 3.9 | 3.3 | 2.9 | 2.5 |
| M17 | 3.5 | 3.6 | 2.5 | 2.8 | 2.3 |

ND = not determined

Study 13—

Spray drying live *Salmonella*. A *Salmonella* Ty21a live formulation was low pressure sonically spray dried under the following conditions:

a) Ty21a inocula were taken from frozen stock, thawed, and diluted 1:400 in 50 ml of Brain Heart Infusion broth in 500 ml baffled Erlenmeyer flask. The culture was grown for 16 hours at 37° C., while being spun at 240 rpm, to an OD of 2.17.

b) A formulated bacterial suspension was prepared by harvesting a bacterial pellet by spinning the suspension for 10 minutes at 2500×g. Supernatant was discarded and the pellet was resuspended in the same volume of formulation SD01 (2.5× above) to provide 25% solids.

c) Formulated material was titered at 3×10$^9$ CFU/mL.

d) The formulation was combined at a flow of 0.75 mL/min with a stream of nitrogen gas at 60 psi in a mixing chamber of a nozzle.

e) The nozzle was vibrated at ultrasonic frequencies.

f) The formulation/gas mixture was sprayed into a drying chamber while drying gas flowed into the chamber at 45° C. Drying gas exited the chamber with a 35-37° C. outlet temperature.

g) Dry particles containing 2.2% residual moisture content were collected. After reconstitution, the formulation had a time zero (t$_o$) titer of 5.7×10$^8$ CFU/mL. See FIG. 6.

h) The dry *Salmonella* particles were stored at 25° C. in order to determine the stability of the spray dried powders. The virus titers upon reconstitution at the various time points are shown in FIG. 7.

Study 14—

Low pressure sonic spraying of a bioactive protein. An alkaline phosphatase enzyme formulation was low pressure ultrasonically spray dried under the following conditions:

a) A solution of horse radish peroxidase (HRP), 356,000 AU/ml, was prepared in liquid formulation SD01 comprised of 25% solids content.

b) The formulation was combined at a flow of 0.5 mL/min with a stream of nitrogen gas at 60 psi in a mixing chamber of a nozzle.

c) The nozzle was vibrated at ultrasonic frequencies.

d) The formulation/gas mixture was sprayed into a drying chamber while drying gas flowed into the chamber at 45° C. Drying gas exited the chamber at 35-37° C. outlet temperature.

e) Dry particles containing 3.96% residual moisture content were collected. Process-related loss was determined to be 0.06 log AU/ml upon reconstitution.

e) The dry HRP particles were stored at 25° C. in order to determine the stability of the spray dried powders. After 2 months of storage, the HRP maintained an activity of 308,000 AU/ml.

Study 15—

Holding Rotavirus at high temperatures in organic solvent suspensions. Spray dried powder samples (approximately 800 mg) were suspended in approximately 2 mL of various organic solvents and their mixtures (see Table 5). Suspensions were placed in sample plates in a drying oven at 55° C. for one hour. Samples were removed from the suspensions and allowed to dry for 15 minutes before measuring activity. The amount of residual solvent as well as the potency change due to solvent exposure are shown in Table 5.

TABLE 5

Residual solvent and potency upon suspension of spray dried Rotavirus powder in indicated organic solvent. The suspension was incubated for 1 hr at 55° C. followed by solvent evaporation. The spray dried Rotavirus powder had a titer of 5.8 ± 0.12 ffu/mL.

| Solvent | Residual solvent (%) | Potency (log ffu/mL) | Potency change (log ffu/mL) |
|---|---|---|---|
| Chloroform | 1.83 | 6.06 ± 0.03 | 0.26 |
| Ethanol | 7.46 | 5.04 ± 0.13 | −0.76 |
| Heptane | 4.91 | 5.97 ± 0.17 | 0.17 |
| Isopropyl Alcohol | 1.06 | 5.84 ± 0.12 | 0.04 |
| Methyl Isobutyl Ketone | 2.55 | 5.78 ± 0.18 | −0.02 |
| Tetrahydrofuran | 3.99 | 5.67 ± 0.06 | −0.13 |
| Ethyl Acetate | 5.02 | 5.77 ± 0.07 | −0.03 |
| Dichloromethane | 1.35 | 5.73 ± 0.23 | −0.07 |
| Dichloromethane:Ethanol:Isopropanol (5:6:4) | 2.83 | 5.83 ± 0.06 | 0.03 |

Example 2

Narrow Particle Size Range from Viscous Solution

Study 1—

Spraying 10% sucrose at low pressures with the sonic nozzle. A 10% sucrose solution was sprayed using high frequency vibrations, resulting in the particle distribution shown in FIG. 2. The solution flowed into the spray nozzle at a pressure of 20 psi.

The spray particle size distribution was obtained by analyzing the spray plume produced by atomizing a 10% sucrose solution at 20 psi using Spraytec. The particle size distribution is shown in Table 6 and the particle size statistics are shown in Table 7.

Measurement values and settings included: open spray lens=300 mm, path length=100.0 mm, particulate refractive index=1.33+0.00i, scatter start=1, dispersant refractive index=1.00, scatter end=35, particle density=1.00 (gm/cc), scattering threshold=1, residual=2.75%, minimum size=0.10 um, extinction analysis=off, and maximum size=2500.00 (um).

TABLE 6

Spray particle size distribution (See FIG. 2).

| Size (μm) | % V < | % V |
|---|---|---|
| 0.117 | 0.00 | 0.00 |
| 0.136 | 0.00 | 0.00 |
| 0.158 | 0.00 | 0.00 |
| 0.185 | 0.00 | 0.00 |
| 0.215 | 0.00 | 0.00 |
| 0.251 | 0.00 | 0.00 |
| 0.293 | 0.00 | 0.00 |
| 0.341 | 0.00 | 0.00 |
| 0.398 | 0.00 | 0.00 |
| 0.464 | 0.00 | 0.00 |
| 0.541 | 0.00 | 0.00 |
| 0.631 | 0.00 | 0.00 |
| 0.736 | 0.00 | 0.00 |
| 0.858 | 0.00 | 0.00 |
| 1.00 | 0.01 | 0.01 |
| 1.17 | 0.12 | 0.11 |
| 1.36 | 0.34 | 0.22 |
| 1.58 | 0.68 | 0.34 |
| 1.85 | 1.13 | 0.45 |
| 2.15 | 1.69 | 0.56 |
| 2.51 | 2.36 | 0.67 |
| 2.93 | 3.17 | 0.81 |
| 3.41 | 4.15 | 0.98 |
| 3.98 | 5.38 | 1.23 |
| 4.64 | 6.97 | 1.59 |
| 5.41 | 9.09 | 2.12 |
| 6.31 | 11.96 | 2.86 |
| 7.36 | 15.81 | 3.85 |
| 8.58 | 20.89 | 5.08 |
| 10.00 | 27.38 | 6.49 |
| 11.66 | 35.31 | 7.93 |
| 13.59 | 44.50 | 9.19 |
| 15.85 | 54.49 | 9.99 |
| 18.48 | 64.57 | 10.08 |
| 21.54 | 73.87 | 9.30 |
| 25.12 | 81.52 | 7.65 |
| 29.29 | 86.89 | 5.37 |
| 34.15 | 89.78 | 2.89 |
| 39.81 | 90.55 | 0.77 |
| 46.42 | 90.55 | 0.00 |
| 54.12 | 90.55 | 0.00 |
| 63.10 | 90.55 | 0.00 |
| 73.56 | 90.55 | 0.00 |
| 85.77 | 90.55 | 0.00 |
| 100.00 | 90.55 | 0.00 |
| 116.59 | 100.00 | 9.45 |
| 135.94 | 100.00 | 0.00 |
| 158.49 | 100.00 | 0.00 |
| 184.79 | 100.00 | 0.00 |
| 215.44 | 100.00 | 0.00 |
| 251.19 | 100.00 | 0.00 |
| 292.87 | 100.00 | 0.00 |
| 341.46 | 100.00 | 0.00 |
| 398.11 | 100.00 | 0.00 |
| 464.16 | 100.00 | 0.00 |
| 541.17 | 100.00 | 0.00 |
| 630.96 | 100.00 | 0.00 |
| 735.64 | 100.00 | 0.00 |
| 857.70 | 100.00 | 0.00 |
| 1000.00 | 100.00 | 0.00 |

TABLE 7

Particle size statistics.

| Title | Average | σ | Min | Max |
|---|---|---|---|---|
| Trans (%) | 98.6 | 0.2139 | 97.8 | 98.9 |
| Dv(10) (μm) | 5.709 | 0.8944 | 4.552 | 8.543 |
| Dv(50) (μm) | 14.81 | 1.312 | 13.88 | 20.65 |
| Dv(90) (μm) | 34.94 | 111.8 | 30.21 | 441.7 |
| % < 10μ (%) | 27.38 | 4.349 | 13.93 | 32.86 |
| D[4][3](μm) | 23.45 | 12.95 | 22 | 90.02 |
| D[3][2](μm) | 10.63 | 1.127 | 9.38 | 14.7 |
| Cv (PPM) | 0.4348 | 0.0923 | 0.3328 | 0.9466 |
| Span | 1.975 | 7.494 | 1.667 | 27.31 |
| Dv(0) (μm) | 0.8844 | 0.05117 | 0.8572 | 1.002 |

Standard Values:
Trans = 98.6 (%)
Cv = 0.4348 (PPM)
SSA = 0.5645 (m²/cc)
Dv(10) = 5.709 (μm)
Dv(50) = 14.81 (μm)
Dv(90) = 34.94 (μm)
Span = 1.975
D[3][2] = 10.63 (μm)
D[4][3] = 23.45 (μm)
153 Records Averaged Study 2—

Spraying 10% sucrose at 30 psi with the sonic nozzle. A 10% sucrose solution was sprayed using high frequency vibrations, resulting in the particle distribution shown in FIG. 3.

The spray particle size distribution was obtained by analyzing the spray plume produced by atomizing a 10% sucrose solution at 20 psi using Spraytec. The particle size distribution is shown in Table 8 and the particle size statistics are shown in Table 9. Measurement values and settings included: open spray lens=300 mm, path length=100.0 mm, particulate refractive index=1.33+0.00i, scatter start=1, dispersant refractive index=1.00, scatter end=35, particle density=1.00 (gm/cc), scattering threshold=1, residual=1.88%, minimum size=0.10 um, extinction analysis=off, and maximum size=2500.00 (um).

TABLE 8

Figure 3:
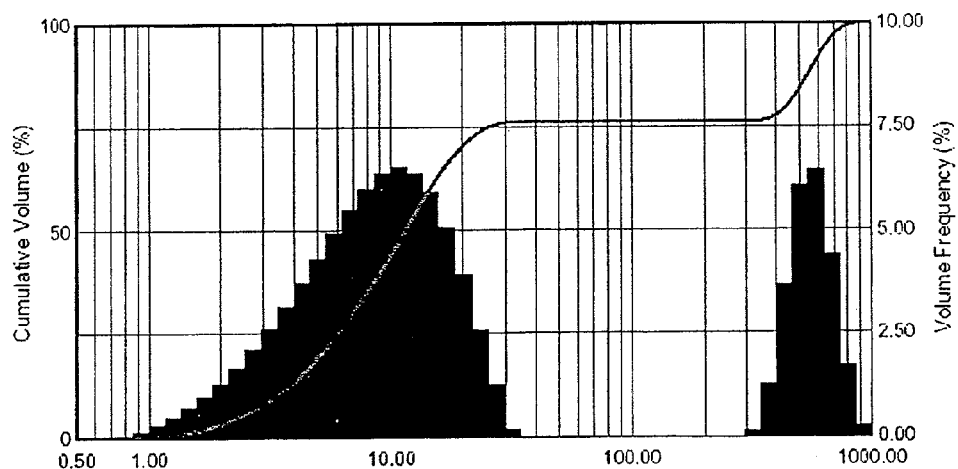
FIG. 3 shows a chart of particle size distribution for spraying 10% sucrose at a pressure of 30 psi from a nozzle vibrating at a high frequency.

Spray particle size distribution (See FIG. 3).

| Size (μm) | % V < | % V |
|---|---|---|
| 0.117 | 0.00 | 0.00 |
| 0.136 | 0.00 | 0.00 |
| 0.158 | 0.00 | 0.00 |
| 0.185 | 0.00 | 0.00 |
| 0.215 | 0.00 | 0.00 |
| 0.251 | 0.00 | 0.00 |
| 0.293 | 0.00 | 0.00 |
| 0.341 | 0.00 | 0.00 |
| 0.398 | 0.00 | 0.00 |
| 0.464 | 0.00 | 0.00 |
| 0.541 | 0.00 | 0.00 |
| 0.631 | 0.00 | 0.00 |
| 0.736 | 0.00 | 0.00 |
| 0.858 | 0.04 | 0.04 |
| 1.00 | 0.18 | 0.14 |
| 1.17 | 0.46 | 0.28 |
| 1.36 | 0.93 | 0.47 |
| 1.58 | 1.62 | 0.69 |
| 1.85 | 2.59 | 0.97 |
| 2.15 | 3.89 | 1.30 |
| 2.51 | 5.57 | 1.68 |
| 2.93 | 7.69 | 2.12 |
| 3.41 | 10.30 | 2.61 |
| 3.98 | 13.44 | 3.14 |
| 4.64 | 17.16 | 3.72 |
| 5.41 | 21.49 | 4.33 |
| 6.31 | 26.42 | 4.93 |
| 7.36 | 31.93 | 5.51 |
| 8.58 | 37.93 | 6.00 |
| 10.00 | 44.30 | 6.36 |
| 11.66 | 50.81 | 6.52 |
| 13.59 | 57.20 | 6.39 |
| 15.85 | 63.12 | 5.92 |
| 18.48 | 68.21 | 5.09 |
| 21.54 | 72.15 | 3.94 |
| 25.12 | 74.74 | 2.59 |
| 29.29 | 75.98 | 1.24 |
| 34.15 | 76.15 | 0.17 |
| 39.81 | 76.15 | 0.00 |
| 46.42 | 76.15 | 0.00 |
| 54.12 | 76.15 | 0.00 |
| 63.10 | 76.15 | 0.00 |
| 73.56 | 76.15 | 0.00 |
| 85.77 | 76.15 | 0.00 |
| 100.00 | 76.15 | 0.00 |
| 116.59 | 76.15 | 0.00 |
| 135.94 | 76.15 | 0.00 |
| 158.49 | 76.15 | 0.00 |
| 184.79 | 76.15 | 0.00 |
| 215.44 | 76.15 | 0.00 |
| 251.19 | 76.15 | 0.00 |
| 292.87 | 76.15 | 0.00 |
| 341.46 | 76.30 | 0.15 |
| 398.11 | 77.54 | 1.24 |
| 464.16 | 81.19 | 3.65 |
| 541.17 | 87.26 | 6.07 |
| 630.96 | 93.69 | 6.43 |
| 735.64 | 98.06 | 4.38 |
| 857.70 | 99.76 | 1.70 |
| 1000.00 | 100.00 | 0.24 |

TABLE 9

Particle Size Statistics.

| Title | Average | σ | Min | Max. |
|---|---|---|---|---|
| Trans (%) | 98.0 | 0.3497 | 97.1 | 99.8 |
| Dv(10) (μm) | 3.36 | 0.4157 | 2.322 | 5.776 |
| Dv(50) (μm) | 11.44 | 52.32 | 6.325 | 572.9 |
| Dv(90) (μm) | 576.3 | 68.01 | 14.39 | 682.6 |
| % < 10μ (%) | 44.3 | 4.539 | 25.05 | 73.63 |
| D[4][3] | 141.7 | 40.36 | 7.657 | 393.8 |
| D[3][2] | 7.846 | 0.641 | 4.781 | 11.82 |
| Cv (PPM) | 0.4526 | 0.1244 | 0.03584 | 0.6959 |
| Span | 50.09 | 9.931 | 1.141 | 65.14 |
| Dv(0) (μm) | 0.7449 | 0.04204 | 0.734 | 1.001 |

Standard Values:
Trans = 98.0 (%)
Cv = 0.4526 (PPM)
SSA = 0.7647 (m$^2$/cc)
Dv(10) = 3.36 (μm)
Dv(50) = 11.44 (μm)
Dv(90) = 576.3 (μm)
Span = 50.09
D[3][2] = 7.846 (μm)
D[4][3] = 141.7 (μm)
177 Records Averaged Study 3—

Spraying water at low pressures with the sonic nozzle. Water was sprayed using high frequency vibrations, resulting in the particle distribution shown in FIG. 4. Water flowed into the spray nozzle at a pressure of 20 psi.

The spray particle size distribution was obtained by analyzing the spray plume produced by atomizing a 10% sucrose solution at 20 psi using Spraytec. The particle size distribution is shown in Table 10 and the particle size statistics are shown in Table 11. Measurement values and settings included: open spray lens=300 mm, path length=100.0 mm, particulate refractive index=1.33+0.00i, scatter start=1, dispersant refractive index=1.00, scatter end=36, particle density=1.00 (gm/cc), scattering threshold=1, residual=2.92%, minimum size=0.10 um, extinction analysis=off, and maximum size=2500.00 (um).

TABLE 10

Figures 4, 5:
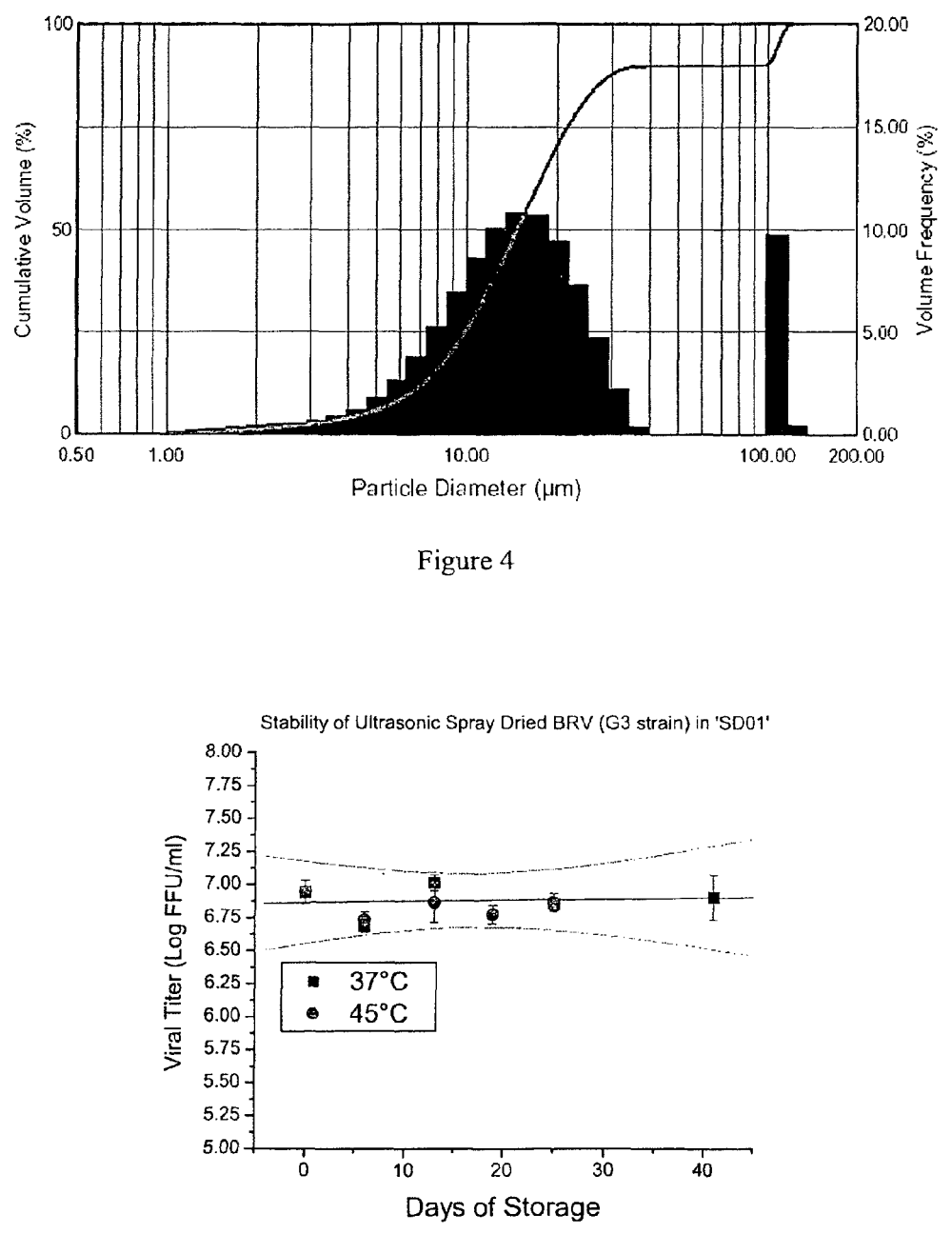

Spray particle size distribution for water (See FIG. 4).

| Size (μm) | % V < | % V |
|---|---|---|
| 0.117 | 0.00 | 0.00 |
| 0.136 | 0.00 | 0.00 |
| 0.158 | 0.00 | 0.00 |
| 0.185 | 0.00 | 0.00 |
| 0.215 | 0.00 | 0.00 |
| 0.251 | 0.00 | 0.00 |
| 0.293 | 0.00 | 0.00 |
| 0.341 | 0.00 | 0.00 |
| 0.398 | 0.00 | 0.00 |
| 0.464 | 0.00 | 0.00 |
| 0.541 | 0.00 | 0.00 |
| 0.631 | 0.00 | 0.00 |
| 0.736 | 0.00 | 0.00 |
| 0.858 | 0.00 | 0.00 |
| 1.00 | 0.06 | 0.06 |
| 1.17 | 0.19 | 0.14 |
| 1.36 | 0.42 | 0.22 |
| 1.58 | 0.72 | 0.30 |
| 1.85 | 1.08 | 0.36 |
| 2.15 | 1.50 | 0.41 |
| 2.51 | 1.96 | 0.47 |
| 2.93 | 2.50 | 0.54 |
| 3.41 | 3.17 | 0.66 |
| 3.98 | 4.04 | 0.87 |
| 4.64 | 5.26 | 1.22 |

TABLE 10-continued

Spray particle size distribution for water (See FIG. 4).

| Size (μm) | % V < | % V |
|---|---|---|
| 5.41 | 7.05 | 1.79 |
| 6.31 | 9.67 | 2.62 |
| 7.36 | 13.44 | 3.78 |
| 8.58 | 18.69 | 5.25 |
| 10.00 | 25.62 | 6.93 |
| 11.66 | 34.26 | 8.64 |
| 13.59 | 44.32 | 10.05 |
| 15.85 | 55.15 | 10.83 |
| 18.48 | 65.82 | 10.67 |
| 21.54 | 75.28 | 9.46 |
| 25.12 | 82.60 | 7.32 |
| 29.29 | 87.29 | 4.69 |
| 34.15 | 89.45 | 2.16 |
| 39.81 | 89.80 | 0.34 |
| 46.42 | 89.80 | 0.00 |
| 54.12 | 89.80 | 0.00 |
| 63.10 | 89.80 | 0.00 |
| 73.56 | 89.80 | 0.00 |
| 85.77 | 89.80 | 0.00 |
| 100.00 | 89.80 | 0.00 |
| 116.59 | 99.59 | 9.79 |
| 135.94 | 100.00 | 0.41 |
| 158.49 | 100.00 | 0.00 |
| 184.79 | 100.00 | 0.00 |
| 215.44 | 100.00 | 0.00 |
| 251.19 | 100.00 | 0.00 |
| 292.87 | 100.00 | 0.00 |
| 341.46 | 100.00 | 0.00 |
| 398.11 | 100.00 | 0.00 |
| 464.16 | 100.00 | 0.00 |
| 541.17 | 100.00 | 0.00 |
| 630.96 | 100.00 | 0.00 |
| 735.64 | 100.00 | 0.00 |
| 857.70 | 100.00 | 0.00 |
| 1000.00 | 100.00 | 0.00 |

TABLE 11

Particle size statistics.

| Title | Average | σ | Min | Max |
|---|---|---|---|---|
| Trans (%) | 97.3 | 0.205 | 96.5 | 97.6 |
| Dv(10) (μm) | 6.408 | 0.7384 | 5.659 | 8.579 |
| Dv(50) (μm) | 14.74 | 1.198 | 14.16 | 19.27 |
| Dv(90) (μm) | 100.3 | 149.3 | 31.83 | 397 |
| % < 10μ (%) | 25.63 | 3.825 | 14.15 | 29.01 |
| D[4][3] (μm) | 24.09 | 14.54 | 24.16 | 74.82 |
| D[3][2] (μm) | 11.13 | 0.9259 | 10.39 | 14.01 |
| Cv (PPM) | 0.8811 | 0.1327 | 0.7427 | 1.414 |
| Span | 6.371 | 10.14 | 1.772 | 26.19 |
| Dv(0) (μm) | 0.8607 | 0.05319 | 0.7463 | 0.8814 |

Standard Values:
Trans = 97.3 (%)
Cv = 0.8811 (PPM)
SSA = 0.5390 (m$^2$/cc)
Dv(10) = 6.408 (μm)
Dv(50) = 14.74 (μm)
Dv(90) = 100.3 (μm)
Span = 6.371
D[3][2] = 11.13 (μm)
D[4][3] = 24.09 (μm)
446 Records Averaged Study 4—

Spraying water, 10% sucrose, 20% sucrose, and SD01 (20%) at low pressures with the sonic nozzle. Water, 10% sucrose, 20% sucrose, and SD01 (20%) were sprayed using high frequency vibrations at flow rates ranging from 2-4 mL/min at spray nozzle pressures ranging from 4-21 psi.

The spray particle size distribution was obtained by analyzing the spray plume produced by the sonic nozzle using Spraytec. The particle size distributions, more specifically $D_v10$, $D_v50$, and $D_v90$, are shown in Tables 12-14 respectively.

TABLE 12

Particle size statistics ($D_v10$) of water, 10% sucrose, 20% sucrose, and 20% SD01 at various flow rates and spray nozzle pressures. Average and standard deviation values (in μm) were calculated from approximately 500 measurements.

| P (psi) | Water | 10% sucrose | 20% sucrose | SD01 (20%) |
|---|---|---|---|---|
| q = 2 mL/min | | | | |
| 4 | 19 ± 1.2 | 14.9 ± 0.8 | 13.0 ± 0.8 | 13.5 ± 1.0 |
| 10 | 9.7 ± 0.2 | 8.4 ± 0.2 | 8.1 ± 0.2 | 8.0 ± 0.2 |
| 21 | 8.0 ± 0.1 | 3.0 ± 0.1 | 7.0 ± 0.1 | 6.0 ± 0.2 |
| q = 0.3 mL/min | | | | |
| 4 | 16.8 ± 1.1 | 15.5 ± 0.9 | 12.5 ± 1.0 | 14.8 ± 0.9 |
| 10 | 9.8 ± 0.2 | 8.8 ± 0.2 | 8.5 ± 0.3 | 8.5 ± 0.4 |
| 21 | 8.1 ± 0.1 | 7.2 ± 0.2 | 7.2 ± 0.2 | 6.3 ± 0.3 |
| q = 4 mL/min | | | | |
| 4 | 18.5 ± 0.9 | 17.2 ± 0.8 | 15.8 ± 1.4 | 18.0 ± 1.1 |
| 10 | 10.0 ± 0.2 | 9.0 ± 0.2 | 8.2 ± 0.2 | 9.0 ± 0.2 |
| 21 | 8.1 ± 0.1 | 7.5 ± 0.2 | 7.4 ± 0.2 | 7.2 ± 0.2 |

TABLE 13

Particle size statistics ($D_v50$) of water, 10% sucrose, 20% sucrose, and 20% SD01 at various flow rates and spray nozzle pressures. Average and standard deviation values (in μm) were calculated from approximately 500 measurements.

| P (psi) | Water | 10% sucrose | 20% sucrose | SD01 (20%) |
|---|---|---|---|---|
| q = 2 mL/min | | | | |
| 4 | 40.1 ± 10.0 | 32.5 ± 2.5 | 28.5 ± 1.5 | 31.2 ± 4.4 |
| 10 | 20.0 ± 0.5 | 17.5 ± 0.4 | 15.0 ± 1.6 | 13.0 ± 1.1 |
| 21 | 9.5 ± 0.1 | 7.7 ± 0.1 | 7.2 ± 0.0 | 7.6 ± 0.1 |
| q = 3 mL/min | | | | |
| 4 | 32.5 ± 2.7 | 34.2 ± 3.2 | 30.5 ± 2.2 | 33.0 ± 4.5 |
| 10 | 20.5 ± 0.4 | 18.0 ± 0.3 | 17.5 ± 0.7 | 16.2 ± 0.9 |
| 21 | 10.0 ± 0.1 | 7.9 ± 0.1 | 7.7 ± 0.1 | 7.8 ± 0.1 |
| q = 4 mL/min | | | | |
| 4 | 36.0 ± 4.0 | 40.0 ± 6.2 | 37.5 ± 5.3 | 43.0 ± 8.0 |
| 10 | 22.0 ± 0.2 | 19.5 ± 1.3 | 18.5 ± 0.7 | 17.8 ± 0.6 |
| 21 | 10.0 ± 0.1 | 8.1 ± 0.1 | 7.9 ± 0.1 | 8.2 ± 0.1 |

TABLE 14

Particle size statistics ($D_v90$) of water, 10% sucrose, 20% sucrose, and 20% SD01 at various flow rates and spray nozzle pressures. Average and standard deviation values (in μm) were calculated from approximately 500 measurements.

| P (psi) | Water | 10% sucrose | 20% sucrose | SD01 (20%) |
|---|---|---|---|---|
| q = 2 mL/min | | | | |
| 4 | 120.4 ± 25.1 | 85.1 ± 15.4 | 74.0 ± 15.6 | 78.0 ± 20.7 |
| 10 | 35.0 ± 8.0 | 35.0 ± 3.1 | 38.4 ± 3.8 | 32.2 ± 4.1 |
| 21 | 22.4 ± 1.1 | 22.0 ± 2.1 | 18.3 ± 2.0 | 15.0 ± 2.2 |

TABLE 14-continued Particle size statistics ($D_v90$) of water,
10% sucrose, 20% sucrose, and 20% SD01 at various
flow rates and spray nozzle pressures. Average
and standard deviation values (in μm) were
calculated from approximately 500 measurements.

| P (psi) | Water | 10% sucrose | 20% sucrose | SD01 (20%) |
|---|---|---|---|---|
| | | q = 3 mL/min | | |
| 4 | 98.7 ± 15.1 | 105.1 ± 20.4 | 92.1 ± 16.5 | 102.2 ± 18.1 |
| 10 | 37.0 ± 5.2 | 38.4 ± 3.0 | 41.8 ± 3.2 | 35.0 ± 5.4 |
| 21 | 22.2 ± 1.0 | 22.3 ± 1.0 | 20.0 ± 1.2 | 17.1 ± 1.5 |
| | | q = 4 mL/min | | |
| 4 | 116.3 ± 20.2 | 124.1 ± 22.1 | 122.5 ± 18.1 | 125.4 ± 21.2 |
| 10 | 43.4 ± 8.2 | 42.1 ± 4.2 | 41.0 ± 3.1 | 40.4 ± 3.1 |
| 21 | 21.0 ± 1.7 | 24.2 ± 1.0 | 21.2 ± 1.0 | 21.2 ± 1.3 |

It is understood that the examples and embodiments described herein are for illustrative purposes only and that various modifications or changes in light thereof will be suggested to persons skilled in the art and are to be included within the spirit and purview of this application and scope of the appended claims.

While the foregoing invention has been described in some detail for purposes of clarity and understanding, it will be clear to one skilled in the art from reading this disclosure that various changes in form and detail can be made without departing from the true scope of the invention. For example, many of the techniques and apparatus described above can be used in various combinations.

All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A method of preparing a bioactive material for oral delivery, the method comprising:
   preparing a suspension or solution comprising the bioactive material and a polymer;
   forming a mixture of pressurized gas with the solution or suspension within a nozzle;
   vibrating the nozzle at a frequency ranging from 1 kHz to 100 kHz, while spraying the mixture to form a gaseous suspension of droplets;
   drying the droplets in a stream of drying gas to form powder particles of the bioactive material and,
   incorporating the particles into a dosage format for oral delivery.

2. The method of claim 1, wherein the bioactive material is selected from the group consisting of bioactive proteins, peptides, antibodies, monoclonal antibodies, enzymes, serums, vaccines, nucleic acids, bacteria, prokaryotic cells, eukaryotic cells, liposomes, *Pneumococcus, Francisella tularensis, Mycobacterium, Salmonella, Shigella, Listeria, Pseudomonas, Staphylococcus, Streptococcus, E. coli*, and a virus.

3. The method of claim 2, wherein the virus is selected from the list consisting of: rotavirus, adenovirus, measles virus, mumps virus, rubella virus, polio virus, influenza virus, parainfluenza virus, respiratory syncytial virus, herpes simplex virus, SARS virus, corona virus family members, cytomegalovirus, human metapneumovirus, filovirus, and Epstein-Bar virus.

4. The method of claim 1, wherein a pressure of the mixture ranges from 10 psi to 100 psi.

5. The method of claim 1, further comprising heating the nozzle to reduce the viscosity of the suspension or solution as it is vibrated.

6. The method of claim 1, wherein the solution or suspension further comprises a polyol selected from the group consisting of: sucrose, trehalose, glucose, raffinose, sorbose, melezitose, glycerol, fructose, mannose, maltose, lactose, arabinose, xylose, ribose, rhamnose, galactose, glucose, mannitol, xylitol, erythritol, threitol, dextrose, fucose, trehalose, polyaspartic acid, inositol hexaphosphate (phytic acid), sialic acid, N-acetylneuraminic acid-lactose, and sorbitol.

7. The method of claim 1, wherein the polymer is selected from the group consisting of: polyvinyl pyrrolidone (PVP), gelatin, collagen, chondroitin sulfate, starch, starch derivatives, carboxymethyl starch, hydroxyethyl starch (HES), polyvinyl alcohol, and dextran.

8. The method of claim 1, wherein the suspension or solution further comprises a surfactant selected from the group consisting of: block co-polymers of polyethylene and polypropylene glycol, polyethylene glycol sorbitan monolaurate, and polyoxyethylene sorbitan monooleate.

9. The method of claim 1, wherein the suspension or solution further comprises an amino acid selected from the group consisting of: arginine, alanine, lysine, methionine, histidine, and glutamic acid.

10. The method of claim 1, wherein the suspension or solution further comprises a divalent cation selected from the group consisting of $Ca^{2+}$, $Zn^{2+}$, $Mg^{2+}$, and $Mn^{2+}$.

11. The method of claim 1, wherein the pressurized gas is selected from the group consisting of: air, nitrogen, oxygen, helium, carbon dioxide, sulfur hexafluoride, chlorofluorocarbons, methane, fluorocarbons, nitrous oxide, xenon, propane, n-pentane, ethanol, and water.

12. The method of claim 1, wherein said forming of the mixture comprises flowing the suspension into the nozzle at a pressure less than 10 psi and flowing the gas into the nozzle at a pressure between 10 psi and 75 psi.

13. The method of claim 1, wherein the gas contains a modifier selected from the group consisting of: methanol, ethanol, isopropanol, chloroform, heptane, methyl isobutyl ketone, tetrahydrofuran, ethyl acetate, dichloromethane, dichloromethane:ethanol:isopropanol (5:6:4), and acetone.

14. The method of claim 1, wherein said forming of the mixture comprises flowing the solution or suspension with the pressurized gas through a mixing chamber.

15. The method of claim 1, wherein said mixing occurs before said spraying.

16. The method of claim 1, wherein the vibrations are generated using the pressurized gas.

17. The method of claim 1, wherein the frequency comprises a frequency ranging from more than 10 kHz to about 30 kHz.

18. The method of claim 1, wherein the vibrations occur while the solution or suspension and the gas are within the nozzle.

19. The method of claim 1, further comprising suspending the powder particles in an organic solvent.

20. The method of claim 19, wherein incorporating the particles into a dosage format comprises drying the solvent to form a solid material comprising the bioactive material.

21. The method of claim 1, wherein the dosage form comprises a wafer, a thin film, a capsule, or a tablet.

22. The method of claim 1, wherein the formulation comprises constituents other than a carbonate.

23. The method of claim 1, wherein the formulation comprises total solids ranging from 20% to 50% by weight.

24. The method of claim 1, wherein the spraying is adapted to provide droplets range in size from about 8 μm to about 43 μm.

25. The particles in the oral dosage format prepared by the method of claim 21.

26. The particles in the oral dosage format prepared by the method of claim 19.

* * * * *